US006708149B1

(12) United States Patent
Turin (10) Patent No.: US 6,708,149 B1
(45) Date of Patent: *Mar. 16, 2004

(54) VECTOR FIXED-LAG ALGORITHM FOR DECODING INPUT SYMBOLS

(75) Inventor: William Turin, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 09/845,134

(22) Filed: Apr. 30, 2001

Related U.S. Application Data

(63) Continuation-in-part of application No. 09/183,474, filed on Oct. 30, 1998, now Pat. No. 6,226,613.

(51) Int. Cl.$^7$ .............................. G10L 15/14; G06K 9/62
(52) U.S. Cl. ........................ 704/240; 704/256; 382/115; 382/186
(58) Field of Search .................................. 704/256, 236, 704/240, 255; 382/181, 182, 186, 115

(56) References Cited

U.S. PATENT DOCUMENTS 5,963,906 A * 10/1999 Turin .......................... 704/256
6,226,613 B1 * 5/2001 Turin .......................... 704/256

OTHER PUBLICATIONS

William Turin, "MAP Decoding using the EM Algorithm," Proc. IEEE 49th Vehicular Technology Conference, vol. 3, p. 1866–1870.*

William Turin and Michele Zorzi, "Performance Analysis of Delay–Constrained Communications over Diverse Burst–Error Channels," Proc. IEEE 50th Vehicular Technology Conference, vol. 3, p. 1305–1309.*

William Turn, "MAP Decoding in Channels with Memory," IEEE Trans. on Communications, vol. 48, No. 5, p. 757–763.*

William Turin, "The Forward–Backward Algorithm—Work Project No. 311614–2003", Technical Memorandum, AT&T, Nov. 1997.*

* cited by examiner

Primary Examiner—Richemond Dorvil
Assistant Examiner—Martin Lerner (57) ABSTRACT

The present invention discloses an apparatus and method of decoding information received over a noisy communications channel to determine the intended transmitted information. The present invention uses a vector fixed-lag algorithm to determine the probabilities of the intended transmitted information. The algorithm is implemented by multiplying an initial state vector with a matrix containing information about the communications channel. The product is then recursively multiplied by the matrix τ times, using the new product with each recursive multiplication and the forward information is stored for a fixed period of time, τ. The final product is multiplied with a unity column vector yielding a probability of a possible input. The estimated input is the input having the largest probability.

9 Claims, 8 Drawing Sheets

| t | $p(I_t=0, Y_1^T)$ | $p(I_t=1, Y_1^T)$ | $p(I_t=0, Y_1^{t+1})$ | $p(I_t=1, Y_1^{t+1})$ | $p(I_t=0, Y_1^{t+3})$ | $p(I_t=1, Y_1^{t+3})$ | $\hat{I}_t$ |
|---|---|---|---|---|---|---|---|
| 0 | 0.00000 | 0.79311 | 0.00013 | 0.24542 | 0.00003 | 0.67481 | 1 |
| 1 | 0.80031 | 0.00000 | 0.24643 | 0.00011 | 0.68170 | 0.00002 | 0 |
| 2 | 0.79309 | 0.00001 | 0.24526 | 0.00049 | 0.67837 | 0.00009 | 0 |
| 3 | 0.79587 | 0.00000 | 0.24631 | 0.00037 | 0.68575 | 0.00007 | 0 |
| 4 | 0.79216 | 0.00000 | 0.24767 | 0.00013 | 0.69090 | 0.00003 | 0 |
| 5 | 0.00000 | 0.77996 | 0.00009 | 0.24807 | 0.00002 | 0.69311 | 1 |
| 6 | 0.00000 | 0.75991 | 0.00006 | 0.24834 | 0.00000 | 0.75992 | 1 |
| 7 | 0.18249 | 0.00043 | 0.13790 | 0.01697 | 0.18249 | 0.00043 | 0 |
| 8 | 0.00043 | 0.24001 | 0.01550 | 0.14708 | 0.00043 | 0.24001 | 1 |
| 9 | 0.52922 | 0.00054 | 0.52922 | 0.00054 | 0.52922 | 0.00054 | 0 |

VECTOR FIXED-LAG ALGORITHM FOR DECODING INPUT SYMBOLS

CROSS-REFERENCES TO RELATED APPLICATIONS

This application is a continuation-in-part of 09/183,474 filed Oct. 30, 1998 of U.S. Pat. No. 6,226,613, issued May 1, 2001, entitled Fixed-Lag Decoding of Input Symbols to Input/Output Hidden Markov Models.

FIELD OF THE INVENTION

The present invention relates generally to a method and apparatus for decoding received symbols. More particularly, the present invention discloses a vector fix-lag algorithm for determining the probabilities of transmitted symbols given received symbols.

BACKGROUND OF THE INVENTION

Forward-backward algorithms (FBAs) are often used in a variety of applications such as speech recognition, handwriting verification such as signature verification, error correction code decoding, etc., to calculate probabilities. As the name suggests, FBAs are a combination of forward algorithms and backward algorithms using vector-matrix products. Equipment that performs the algorithms requires large amounts of memory for storing all the matrices and intermediate matrix products needed to support the algorithms.

FBAs can be used to calculate the probabilities associated with the functions of Hidden Markov Models (HMMs) in voice recognition to recognize discrete and continuous speech. When a HMM is applied to describe a communication channel, products of sequences of probability density matrices are used to estimate the a posteriori probabilities of transmitted symbols given the received symbols. In other words, mathematical models are used to estimate the probabilities of the transmitted symbol knowing the received symbol.

Conventional FBA techniques require that a sequence of matrices multiplied by a first vector in a recursive manner in a forward part of the algorithm be stored in memory. The decoding process can start only after a long sequence of symbols has been received. This is unacceptable in many applications (a telephone application, for example) that impose strict constraints on the message delivery delay. Thus, new technology is needed to improve the vector-matrix product calculation that enables a decoder to estimate the product, and thus estimate the input symbols, without waiting for the whole symbol sequence to be received. This technology enables a designer to trade the product estimation accuracy for smaller delays in information delivery.

SUMMARY OF THE INVENTION

The invention provides a method and apparatus that performs a fixed-lag computation process.

The present invention discloses an apparatus and method of decoding information received over a noisy communications channel to determine the intended transmitted information. The present invention improves upon the traditional forward-backward algorithm with a vector fixed-lag algorithm. The algorithm is implemented by multiplying an initial state vector with a matrix containing information about the communications channel. The product is then recursively multiplied by the matrix τ times, using the new product with each recursive multiplication. The new product forward information is stored in storage elements. The final product is multiplied with a final state column vector yielding a probability of a possible input. The estimated input is the input having the largest probability. The invention may be applied to a maximum a posteriori estimation of input symbols in systems modeled by an input-output HMM such as symbols transmitted over noisy channels, to handwriting and speech recognition and other probabilistic systems.

The vector fixed-lag process of the invention replaces the conventional forward-backward algorithm. This eliminates the need of saving long sequences of the forward vectors. Accordingly, memory requirements and decoding delay are reduced when using the fixed-lag process to decode information transmitted over a communication channel.

The present invention discloses a fixed-lag method for determining the probability of a transmitted symbol at a time t, transmitted along a communications channel with bursts of errors, given a received symbol. The method comprises obtaining initial state information vector about the channel and obtaining channel information matrices describing the probabilities that the transmitted symbol would be transmitted along a communications channel with and without error. The method further comprises generating intermediate probabilities, each intermediate probability being the product of the initial state information vector at a time previous to time t, and a channel information matrix, storing the intermediate probabilities in storage elements, and multiplying a last intermediate probability with a final state vector to yield the probability of the transmitted symbol.

BRIEF DESCRIPTION OF THE DRAWING

The invention will be described with reference to the accompanying Figures in which like elements are referenced with like numerals and in which.

DETAILED DESCRIPTION OF THE INVENTION

The invention provides a method and apparatus to generate estimates for processing data symbols using algorithms and sequences of matrices. The purpose of the algorithms is to determine the intended transmitted or input symbol from the received symbol, which has been corrupted with noise. In general, the matrices reflect the relationship between a system state variables, input sequences and output sequences. For example, the matrices may describe a HMM of a communication system representing the following probabilities: $\Pr(X_t, Y_t, S_t | S_{t-1})$. In other words, the matrices describe the transition from state $S_{t-1}$ (i.e., state S at a prior time of t−1) to the next state $S_t$ (i.e., state S at a later time t) and generate the next input symbol $X_t$ and the next output symbol $Y_t$.

The communication system modeled above could be a wireless radio system, fiber optical system, wired system, or other suitable system. Many other systems can be analyzed using state matrix information. For instance, bioelectrical signals such as electrocardiograms, seismic measurements, handwriting recognition devices, speech recognition devices, control systems and others can be modeled as machines or processes whose next state depends upon the current state, plus input information or symbols. All these systems can be described in terms of communications systems. For example, in speech recognition, the output sequence is what is heard, while the input sequence is the intended meaning. In handwriting recognition, the output is the sequence of scanned handwritten symbols, while the input is the intended sequence of letters that a decoder must recognize. Therefore, in the sequel we will use the communication system terminology, but the results have a broader application.

For the applications noted above or for other suitable applications, the following general structure may be used to calculate the matrix product to determine the probability of the intended input.

$$p_t = \alpha_0 \prod_{i=1}^{t-1} M_i W_t \prod_{i=t+1}^{T} M_i \beta_T = \alpha_{t-1} W_t \beta_t \quad (1)$$

where $\alpha_0$ is a row vector representing an initial condition, $\beta_T$ is a column vector representing a terminal condition, and $M_i$ and $W_i$ are square matrices. For different applications, matrices $M_i$ can have different meanings.

Although not exemplified here, the matrices $M_i$ and $W_i$ could be of a dimension other than square as long as the dimensions of the row and column vector correspond appropriately to permit for proper matrix multiplication.

The evaluation of the parameter $p_t$ according to Equation (1) above is conventionally done by the forward-backward algorithm (FBA). The FBA requires that the decoding unit must receive all symbols in an input sequence, compute and store the forward vectors $$\alpha_t = \alpha_0 \prod_{i=1}^{t} M_i \text{ for all } t = 1, 2, \ldots, T \quad (2)$$

then compute the backward vectors $$\beta_t = \prod_{i=t+1}^{T} M_i \beta_T \quad (3)$$

and compute $p_t = \alpha_{t-1} W_t \beta_t$ for all t=T−1,T−2, . . . , 1. T represents some total time period which is usually equal to the number of observed output symbols.

This calculation places large demands on memory and processing resources. The present invention avoids the necessity of storing the complete symbol sequence and reduces processing time compared to conventional technology. The invention does so in part by observing that a sufficient estimate of $p_t$ may be made, if the application exhibits a fading or finite memory so that some tail portion of the product $$\beta_t = \prod_{i=t+1}^{T} M_i \beta_T$$

shown in Equation 1 may be ignored with little penalty in accuracy.

Figure 1:
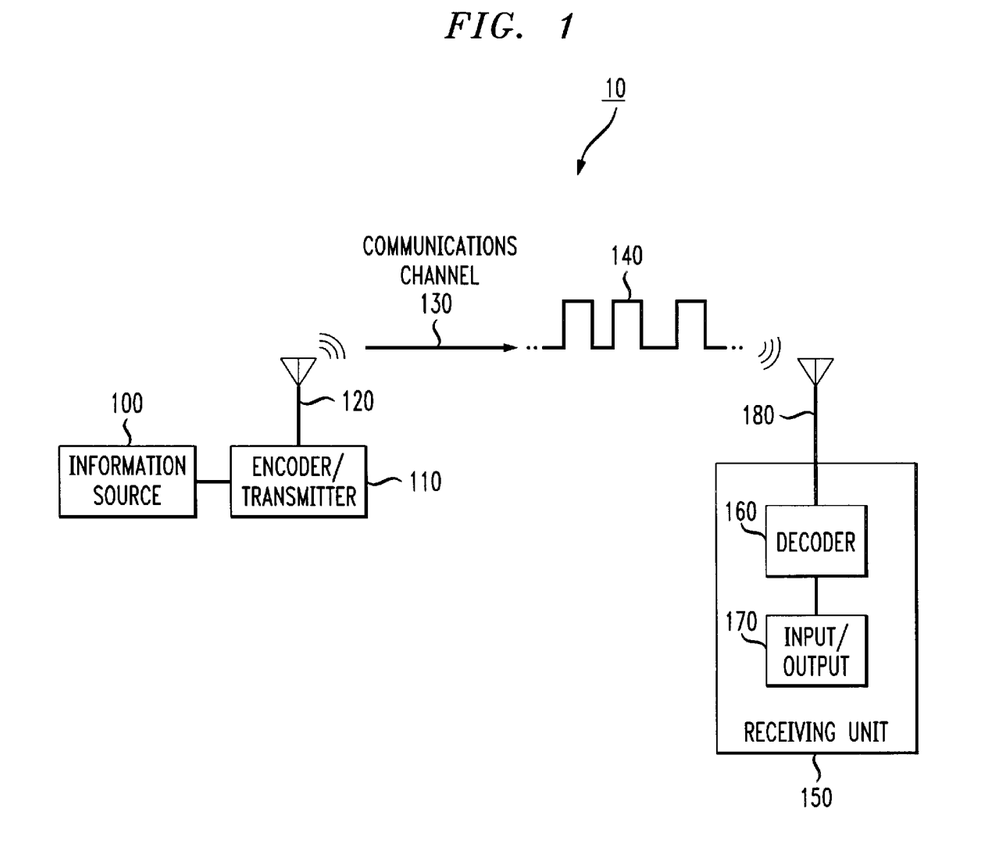
FIG. 1 illustrates information processing according to the invention over a wireless communication channel.

FIG. 1 shows an exemplary communications system 10 as a typical application of the estimate process according to the invention. In FIG. 1, an information source 100 outputs information signals to an encoder/transmitter 110, such as a base station in a wireless cellular communications system. Encoder/transmitter 110 transmits an encoded signal from antenna 120 over a communication channel 130, which may, for instance, be the radio frequency channels according to Personal Communications Service (PCS) or other forms of communication channels. The transmitted symbols 140 are received at a receiving unit 150, which may be a mobile cellular telephone, over an antenna 180. The receiving unit 150 receives the transmitted symbols 140 and processes them in a decoder 160 to provide decoded output symbols to an input/output unit 170. The input/output unit 170 may, for instance, output voice sounds in a cellular telephone.

Real communication channels are characterized by the bursty nature of errors that can be modeled quite accurately by HMMs as known in the art. Therefore, communications system 10 may be modeled by an HMM, and the transmitted symbols 140 may be decoded by known methods such as maximum a posteriori (MAP) symbol estimation as briefly discussed herein.

In many applications, it is necessary to find a symbol $X_t$ maximum a posteriori estimate by maximizing its a posteriori probability density function (APPDF) as follows:

$$p(X_t | Y_1^T) = \frac{p(X_t, Y_1^T)}{p(Y_1^T)}. \quad (a)$$

Since the received sequence $Y_1^T$ is fixed, it is sufficient to maximize the unnormalized APPDF $p(X_t, Y_1^T)$ as follows:

$$\hat{X}_t = \underset{X_t}{\operatorname{argmax}}\ p(X_t, Y_1^T) = \underset{X_t}{\operatorname{argmax}}\ p(X_t | Y_1^T) \quad (b)$$

where $$p(X_t, Y_1^T) = \pi \prod_{i=1}^{t-1} P(Y_i) P(X_t, Y_t) \prod_{i=t+1}^{T} P(Y_i) 1. \quad (c)$$

This equation can be evaluated by the forward-backward algorithm.

Forward part: Compute and save $$\alpha(Y_1^0) = \pi,\ \alpha(Y_1^t) = \alpha(Y_1^{t-1})P(Y_t),\ t=1,2\ldots,T-1. \quad (d)$$

Backward part: For t=T, T−1, . . . , 2 compute $$p(X_t, Y_1^T) = \alpha(Y_1^{t-1})P(X_t, Y_t)\beta(Y_{t+1}^T),\text{ where} \quad (e)$$

$$\beta(Y_{T+1}^T)=1,\ \beta(Y_t^T)=P(Y_t)\beta(Y_{t+1}^T). \quad (f)$$

If we need to calculate only one or two of the products in Equation (c), we can apply a forward algorithm, but if we need to calculate $p(X_t, Y_1^T)$ for many values of t, we use the forward-backward algorithm.

Since all products of probabilities tend to zero, to increase the calculation accuracy and avoid underflow, it is necessary to scale the equations if T is not small. The scaled vectors are denoted as follows:

$$\bar{\alpha}(Y_1^t) = c_t \alpha(Y_1^t). \tag{g}$$

After the variable substitution Equation (d) takes the form $$\bar{\alpha}(Y_1^{t+1}) = \lambda_{t+1} \bar{\alpha}(Y_1^t) P(Y_t), \tag{h}$$

where $\lambda_{t+1} = c_{t+1}/c_t$.
Let $d_t$ be the scaling factor for $\beta(Y_t^T)$:

$$\bar{\beta}(Y_t^T) = d_t \beta(Y_t^T). \tag{i}$$

If we use $\bar{\alpha}(Y_1^{t-1})$ instead of $\alpha(Y_1^{t-1})$ and $\bar{\beta}(Y_{t+1}^T)$ instead of $\beta(Y_{t+1}^T)$ in Equation (e), we obtain:
$\bar{p}(X_t, Y_1^T) = p(X_t, Y_1^T) \mu_t$ where $\mu_t = c_1 c_2 \ldots c_{t-1} d_{t+1} \ldots d_T$. If the scaling factors do not depend on $X_t$, then $\mu_t$ does not depend on $X_t$, and the solution of Equation (b) does not change if we replace $P(X_t, Y_1^T)$ with $\bar{p}(X_t, Y_1^T)$.

In principle, $c_i$ and $d_i$ can be any numbers. However, it is convenient to choose $$c_t = 1/\alpha(Y_1^t)1. \tag{j}$$

so that the normalized vector $\bar{\alpha}(Y_1^T)1 = 1$
The normalized vectors can be obtained recursively using Equation (d) and normalizing the result after each recursive step:

$$\hat{\alpha}(Y_1^{t+1}) = \bar{\alpha}(Y_1^t) P(Y_t), \bar{\alpha}(Y_1^{t+1}) = \lambda_{t+1} \hat{\alpha}(Y_1^{t+1}) \tag{k}$$

where $$\lambda_{t+1} = 1/\hat{\alpha}(Y_1^{t+1})1 = c_{t+1}/c_t.$$

The normalization factors $c_t$ can be recovered from the normalization factors $\lambda_t$ of the scaled forward algorithm (k):

$$c_t = \prod_{i=1}^{t} \lambda_i.$$

We can select the normalizing factors for $\beta(Y_t^T)$ similarly. However, if we use $$d_t = \prod_{i=1}^{T} \lambda_i$$

we will have $c_t d_t = 1/p(Y_1^T)$, $\forall t$ and we can write the APPDF as $$p(X_t|Y_1^T) = \bar{\alpha}(Y_1^{t-1}) P(X_t, Y_t) \bar{\beta}(Y_{t+1}^T)/\lambda_t.$$

If T is large and the maximum density functions do not have special structures simplifying their multiplication, the forward-backward algorithm uses a lot of computer resources. Therefore, it is beneficial to find approximate algorithms that have a satisfactory accuracy.

One of the approaches is based on the fact that many processes have a "fading" memory: the process samples dependency is a decreasing function of the sample time separation. In this case $$p(X_t, Y_1^t) \approx p(X_t, Y_1^{t+\tau})$$

and we can use the fixed-lag algorithm.

With reference back to the modeling, a FBA process may be applied that evaluates a probability at time t, $P(X_t|Y_1^T)$, for the transmitted symbol $X_t$ and for the actually received symbols $Y_1^T = Y_1, Y_2, \ldots Y_T$. $P(X_t|Y_1^T)$ is proportional to $$P(X_t, Y_1^T) = \alpha_{t-1} P(X_t, Y_t) \beta_t$$

where $\alpha_0$ is the row vector of the Markov state initial probabilities, $\alpha_t$, and $\beta_t$ are computed according to Equations (2) and (3) in which $M_i = P(Y_i)$ representing the matrix probabilities of receiving symbols $Y_i$. However, channel distortions affecting the transmitted information symbols 140 only persist for a finite period of time, for instance as a result of multipath fading. Thus, it is only necessary to look forward by a fixed period of time or time lag τ through the received sequence to decode the transmitted symbols.

If the memory in the communication channel is of length τ, then probability $P(X_t|Y_1^T)$ at time t of a transmitted symbol $X_t$, given the received sequence may be estimated by the expression:

$$p_t \approx \alpha_0 \prod_{i=1}^{t-1} M_i W_t \prod_{i=t+1}^{t+\tau} M_i \beta_\infty = a_{t-1} W_t \beta_{t,\tau} \tag{3.1}$$

where $W_t = P(X_t, Y_t)$ is the matrix probability of transmitting $X_t$ and receiving $Y_t$. When compared with the conventional FBA, at a given time t, only the terms extending from 1 to t+τ rare computed instead of 1 to T, where T is the total time period of the complete received symbols. Thus, the terms extending from t+τ to T are eliminated when computing the estimate. The invention presents the algorithm for computing vectors $$\beta_{t,\tau} = \prod_{i=t+1}^{t+\tau} M_i \beta_\infty = M_{t+1}^{t+\tau} \beta_\infty \tag{4}$$

recursively, thus saving both the memory space and processing time required to support computation of $p_t$.

The invention makes use of the fact that the matrices $$M_{t+1}^{t+\tau} = \prod_{i=t+1}^{t+\tau} M_i$$

can be computed recursively by the following equation $$M_{t+k+1}^{t+\tau+1} = M_{t+k+1}^{t+\tau} M_{t+\tau+1}, k = 1, 2, \ldots, \tau \tag{5}$$

and then compute $\beta_{t+1} = M_{t+2}^{t+\tau+1} \beta_\infty$. The vector $\beta_\infty = 1$ in most applications. With $\beta_\infty$ equal to a unity column vector, the mathematical computation is the summing of elements (by rows) in the matrix $M_{t+2}^{t+\tau+1}$ being multiplied by the unity vector.

Figure 2:
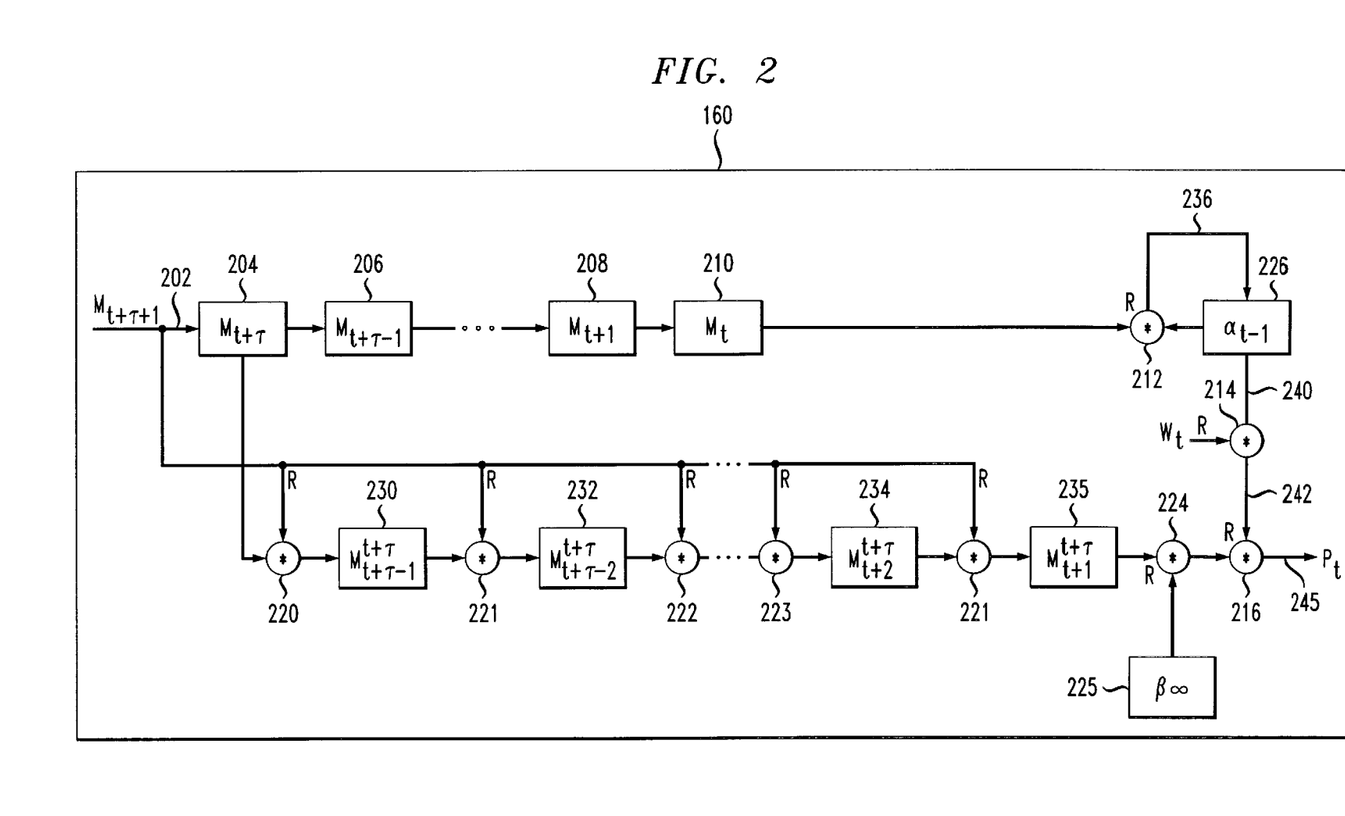
FIG. 2 illustrates a decoder used to decode symbols transmitted according to FIG. 1.

FIG. 2 shows a flow diagram of a general process for generating the estimate $p_t$. In this figure, letter "R" on signal lines indicates that the corresponding matrix multiplies the matrix on the other line from the right. It is important to show, because matrix products are not commutative. As illustrated in FIG. 2, $M_{t+\tau+1}$ is input on signal line 202, and then multiplied by a series of matrices: $M_{t+\tau}$ stored in storage element 204, $M_{t+\tau+1}$ stored in storage element 206, ..., $M_{t+1}$ stored in storage element 208, and $M_t$ stored in storage element 210. $\alpha_{t-1}$ stored in storage element 226 is then right-multiplied by multiplier 210 and the result is output over signal line 236 to update $\alpha_{t-1}$ to $\alpha_t$. $\alpha_t$ is output over signal line 240 for right multiplication by $W_t$ by multiplier 214. The result of the multiplier 214 is output over signal line 242 to multiplier 216 as a forward portion of the estimate $p_t$. The storage elements 204, 206, ..., 208, and 210 serve to delay the matrices $M_t \rightarrow M_{t+\tau}$ to synchronize the generation of the forward pattern with the generation of a backward portion as described below. The partial matrix product $M_{t+1}^{t+\tau}$ stored in the storage element 235 is then right multiplied by the vector $\beta_\infty$ stored in the storage element 228 and the result is multiplied from the left by the forward portion obtained on line 242 thus producing the desired estimate $p_t$. The partial matrix products stored in the storage elements 230, 232, ..., 235 may be generated in a progressive manner according to equation (5) by storing a sequence of $\tau-1$ matrix products where each member of the sequence is generated by matrix multiplying a prior member of the sequence by $M_{t+\tau+1}$ from the right and storing the result in a storage element of the next sequence member.

As shown in FIG. 2, storage elements 230, 232, ..., 234 and 235 store the sequence of matrix products. When $M_{t+\tau+1}$ is generated, 1) the content of the storage element 235 is matrix multiplied with $\beta_\infty$ by multiplier 225 to generate the next backward portion, 2) the storage element 235 is then used to store the result of the matrix product between the content of the storage element 234 and $M_{t+\tau+1}$ generated by multiplier 224, 3) the storage element 234 is then used to store the matrix product between the content of the next storage element earlier in the sequence and $M_{t+\tau+1}$ generated by the multiplier 222 and so on. After the content of the storage element 232 is used to generate the matrix products for the following storage element in the sequence, it is used to store the output of multiplier 221. Finally, the storage element 230 stores the product $M_{t+\tau}M_{t+\tau+1}$. Thus, the storage elements 230, 232, 234 and 235 stores $\tau-1$ sequence of matrix products for generating the backward portion of the $p_t$. The backward portion is multiplied by multiplier 216 with the forward portion to generate $p_t$ as the probability at time t.

In the alternative implementation of the algorithm, we assume that it is possible to calculate the inverse matrices $M_t^{-1}$. In this case, the partial matrix products can be evaluated according to the following equation $$M_{t+2}^{t+\tau+1} = M_{t+1}^{-1} M_{t+1}^{t+\tau} M_{t+\tau+1} \quad (6)$$

Therefore, the whole sequence of storage elements and multipliers 230 through 235 in FIG. 2 may be replaced with a single storage device, two multipliers and the matrix inversion unit. The latter may be replaced with storage units if the inverse matrices are pre-computed and saved. This embodiment is described below more particularly with respect to FIG. 7.

Figure 3:
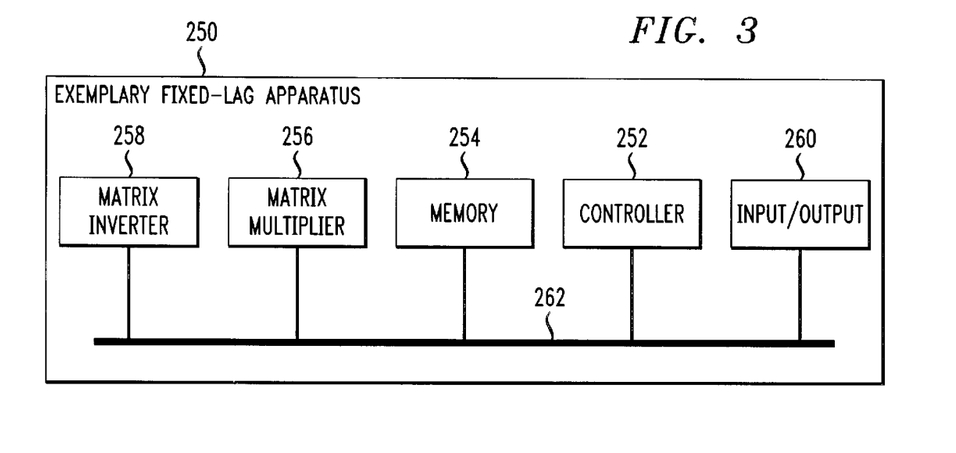
FIG. 3 illustrates a decoder in another aspect.

The generation of $p_t$ according to FIG. 2 can be implemented by an exemplary fixed-lag apparatus 250 shown in FIG. 3. The fixed-lag apparatus may include a controller 252, a memory 254, a matrix multiplier 256, a matrix inverter 258 and an input/output device 260. The above components are coupled together via signal bus 262.

While the fixed-lag apparatus 250 is shown with a common bus architecture, other structures are well known to one of ordinary skill in the art. In addition, the functions performed by each of the devices could be performed by a general purpose computer, digital signal processors, application specific integrated circuits, DGA's, DLA, etc. which are well known in the art.

When generating $p_t$, the controller 252 reads values of the matrices $M_i$ out of memory 254 for multiplication by matrix multiplier 256 or inversion by matrix inverter 258. The individual matrices $M_t$–$M_{t+\tau}$ are stored in memory 254, which may be electronic random access memory or other forms of electronic or other storage appreciated by persons skilled in the art. Memory 254 likewise contains the matrix products of storage elements 234–235 which are $M_{t+\tau-1}M_{t+\tau}$, $M_{t+\tau-1}M_{t+\tau-2}M_{t+\tau-3}$, ..., $M_{t+1}M_{t+2} \ldots M_{t+\tau}$.

At each time t, the controller 252 generates the matrix $M_{t+\tau+1}$. This matrix may be generated based on the HMM of the underlying process and received sequence of symbols for the period T (e.g., received encoded data over a communication channel, or a handwriting analysis process). Once generated, $M_{t+\tau+1}$ is stored in the memory 254 and used for the fixed-lag operation as described below.

The controller 252 directs matrix multiplier 256 to generate $\alpha_t$ by multiplying $\alpha_{t-1}$ stored in storage element 226 by $M_t$, further directing the matrix multiplier 256 to multiply $\alpha_t$, by $W_t$ to generate the forward portion. The controller 252 generates the backward portion by directing the matrix multiplier 256 to multiply $\beta_\infty$ stored in the storage element 228 with $M_{t+1}^{t+\tau}$ stored in storage element 235. The controller 252 then generates $p_\tau$ by directing the matrix multiplier 256 to multiply the forward portion with the backward portion and outputs $p_t$ to further downstream processes.

After generating the backward portion, the controller 252 proceeds to generate each of the matrix products to be stored in the storage element 230, 232, 234 and 235 by directing the matrix multiplier 256 to multiply $M_{t+\tau+1}$ with the contents of each respective storage element and storing the result in the next following storage element in the sequence. In this way, all the contents of the storage elements 230, 232, 234 and 235 are prepared for the generation of $p_{t+1}$.

Figure 4:
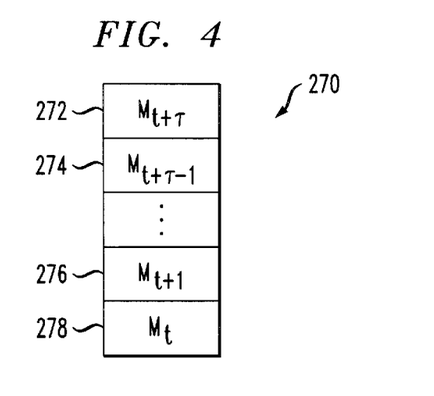
FIG. 4 illustrates matrix storage according to the invention.

FIG. 4 shows a FIFO 270 as an exemplary device for the storage elements 204, 206, 208 and 210. The FIFO 270 has $\tau+1$ locations 272, 274, 276 and 278 that correspond to the storage elements 204, 206, 208 and 210, respectively.

For each t, $M_t$ is read from the FIFO 270 and a $M_{t+\tau+1}$ is generated and "pushed" into the FIFO 270. For example, at time t=1, the FIFO 270 contains $M_{1+\tau}$ in location 278, $M_\tau$ in location 274, $M_2$ in location 276 and $M_1$ in location 278. At t=2, the FIFO 270 contains $M_{2+\tau}$ in location 278, $M_{\tau+1}$ in location 274, $M_3$ in location 276 and $M_2$ in location 278. $M_1$ is consumed by vector matrix multiplication with $\alpha_0$ to for $\alpha_1$ now stored in storage element 226.

Figure 5:
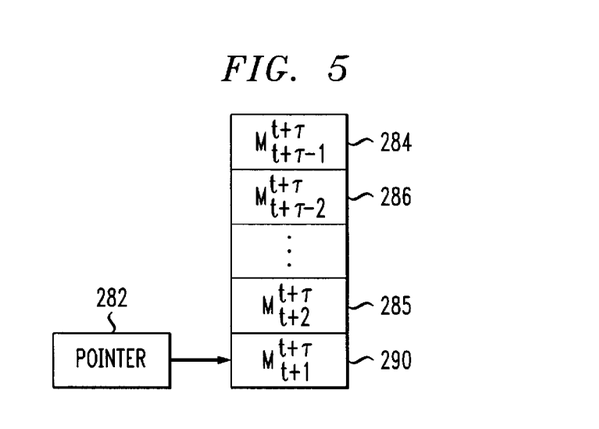
FIG. 5 illustrates matrix storage according to the invention in another aspect.

FIG. 5 shows an exemplary memory management scheme of a memory space 280 for storage elements 230, 232, 234 and 235. A block of locations 284, 286, 288 and 290 in the memory 254 may be set aside corresponding to the storage elements 230, 232, 234 and 235. Thus, at t=1, location 284 contains $M_\tau M_{1+\tau}$, location 286 contains $M_{\tau-1}M_\tau M_{1+\tau}$ location 288 contains $M_3 M_4 \ldots M_{1+\tau}$, and location 290 contains $M_2 M_3 \ldots M_{1+\tau}$. The pointer 282 is pointing at location 290 in preparation for generating the backward portion of $p_1$. At t=2 the controller 252 reads the contents of the location pointed to by the pointer 282 and obtains $M_2 M_3 \ldots M_{1+\tau}$ and sends this matrix product to the matrix multiplier 256 to generate the first backward portion $M_2^{1+\tau}\beta_\infty$. Then the controller 252 directs the matrix multiplier 256 to multiply $M_{1+\tau}$ with $M_{2+\tau}$ and stores the product in the location pointed to by the pointer 256 which is location 290 thus overwriting $M_2 M_3 \ldots M_{1+\tau}$. The controller 252 then updates the pointer 256 to point to location 288 by decrementing the pointer 256 by M, for example, where M is the number of elements in each of the matrix product. In this regard, each of the locations 284, 286, 288 and 290 actually is a block of memory space sufficient to store one of the matrix products.

Then, the controller 252 directs the matrix multiplier 256 to matrix multiply the contents of each of the remaining locations 284, 286 and 288 with $M_{2+\tau}$. At this point, the memory space 280 is ready for the next cycle to generate the backward portion for $p_{t+1}$.

After $\tau-2$ cycles, the pointer 282 would be pointing to location 284. During the $\tau-1$ cycle the pointer 256 would be incremented by $\tau-2$ to again point to location 290 which essentially permits the memory space 280 to be a circular buffer of $\tau-1$ locations 284, 286, 288 and 290.

Figure 6:
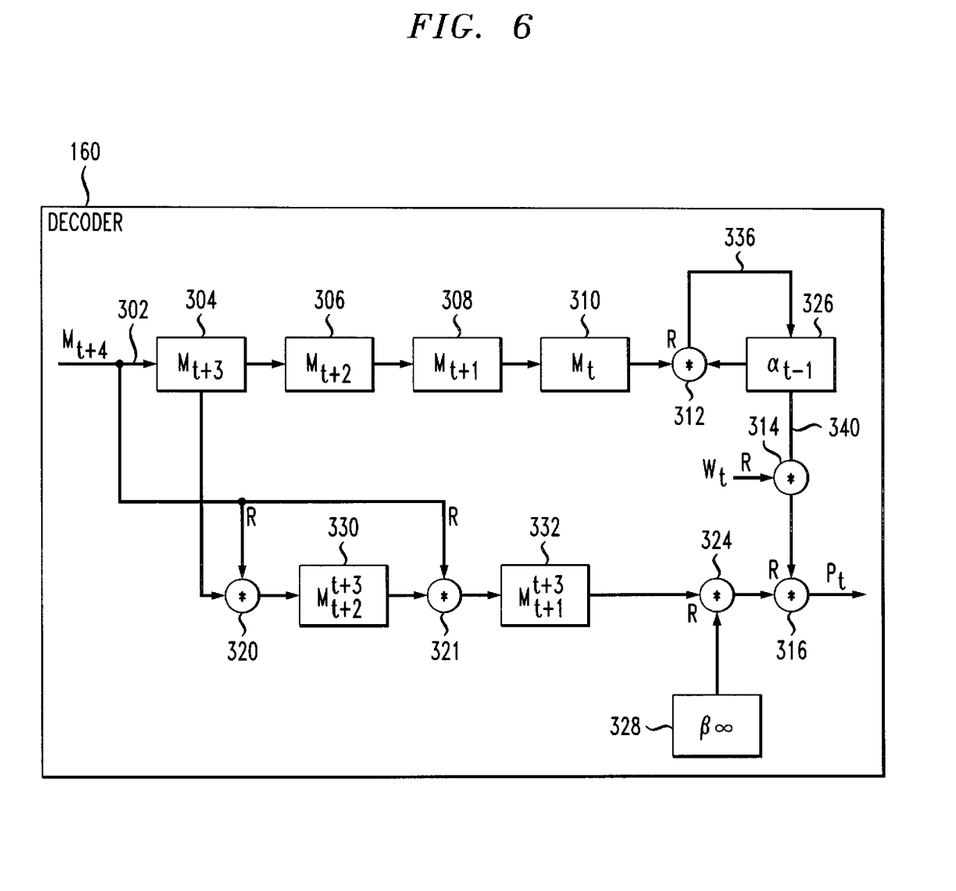
FIG. 6 illustrates a fixed-lag decoding apparatus for three memory elements according to the invention.

FIG. 6 shows a specific example of decoding according to the invention where $\tau$ is set equal to 3 and T=256. As illustrated in FIG. 6, the calculations are initialized using $\alpha_{t-}$ and $M_{t+1}{}^{t+3}$ to generate $p_t$. Matrix $M_{t+4}$ is then input over signal line 302 to a sequence of matrices $M_{t+3}$, $M_{t+2}$, $M_{t+1}$, and $M_t$ stored in storage elements 304, 306, 308 and 310, respectively, right-multiply the $M_t$ in storage element 302 by multiplier 312 with $\alpha_{t-1}$ (of storage element 326) thus generating $\alpha_t$. The forward portion is generated by $\alpha_t$ is output over signal line 336 to store $\alpha_t$ into storage element 326, thus updating $\alpha_{t-1}$ to $\alpha_t$. Simultaneously, $\alpha_{t-1}$ is output over signal line 340 to right-multiplier 314 for right-multiplication by $W_t$, that product in turn being output to multiplier 316. Multiplier 320 receives $M_{t+1}{}^{t+3}$ stored in storage 332 and right-multiplies it by $\beta_\infty$ stored in storage 328 and then output to multiplier 316 which multiplies it from the left by the quantity $\alpha_{t-1} W_t$ and outputs over signal line 338 the desired result $p_t = \alpha_{t-} W_t M_{t+1}{}^{t+3} \beta_\infty$. In the mean time, the contents of the storage elements 330 and 332 are replaced by $M_{t+3}{}^{t+4} = M_{t+3} M_{t+4}$ and $M_{t+2}{}^{t+4} = M_{t+2} M_{t+3} M_{t+4}$, respectively. The storage elements 304, 306, 308 and 310 also updated by shifting their contents thus preparing for the next cycle.

In decoder 160, the received value $p_t$ which is used to decode the current transmitted symbol. The following illustrates the calculation of several initial values of $p_t$.

$p_1 \alpha_0 W_1 M_2 M_3 M_4 \beta_\infty$, $\alpha_1 = \alpha_0 M_1$, $M_4{}^5 = M_4 M_5$, $M_3{}^5 = M_3 M_4 M_5$ $p_2 = \alpha_1 W_2 M_3{}^5 \beta_\infty$, $\alpha_2 = \alpha_1 M_2$, $M_5{}^6 = M_5 M_6$, $M_4{}^6 = M_4 M_5 M_6$, and so on.

As can be seen from FIG. 2 and from $$p_t \approx \alpha_0 \prod_{i=1}^{t-1} M_i W_i \prod_{i=t+1}^{t+\tau} M_i \beta_\infty \quad (7)$$

in the invention, the conventional products of Markov matrices are truncated according to the persistence of memory in communications channel 130, reducing storage and computation significantly.

The effects of memory on communications channel 130 are accounted for by the product of matrices $M_t - M_{t+3}$. Therefore, decoder 160 as illustrated in FIG. 2 outputs to input/output unit 170 a probability value $p_t$ that a symbol $X_t$ was transmitted at time t. In the illustrative embodiment, the encoder/transmitter 110 may be transmitting wireless voice or data signals over communications channel 130, and input/output unit 170 may output a voice output over receiving unit 150, such as a voice sound.

The general form of the equation for calculating the partial matrix products according to the invention is shown in Equation 7 above for arbitrary $\tau$. As can be seen from that expression, in the invention it is only necessary to compute matrix products of matrices modeling the communication channel, whether wireless, radio frequency, optical or otherwise, over the period of time $\tau$ representing channel memory.

The transmitted information symbols 140 are illustrated in FIG. 1 as being cellular wireless voice or data symbols, however, it will be understood that the invention can be applied to any information signals that can be modeled by an HMM. Such information signals could also be, for instance, voice recognition information, handwriting information, bioelectrical signals such as electrocardiographs, seismic signals, and others. In a handwriting implementation, for instance, each letter would represent an information symbol which is modeled by an HMM, whose states are composed of preceding and succeeding letters and some hidden states representing a particular style of writing, for example, which would be reflected in matrices drawn to that model.

The system and method of the invention according to the foregoing description achieves information decoding in a streamlined manner. Using the invention, it is possible among other things to avoid having to store all forward (as well as backward) vectors in an HMM, and moreover to look forward through the chain by only a fixed lag, rather than through the entire sequence. This reflects the realization that time delays or fades which create a memory effect and distort a channel are of finite duration. Those distortions could only influence the present information signal as long as those time delays, fades or other distortions are still propagated. The invention capitalizes on these and other characteristics of non-Gaussian channels to achieve improved processing efficiency, while placing much reduced demands on processor bandwidth and storage capacity. Further efficiencies are gained when coefficients are recovered using an inverse matrix as described above.

Figure 7:
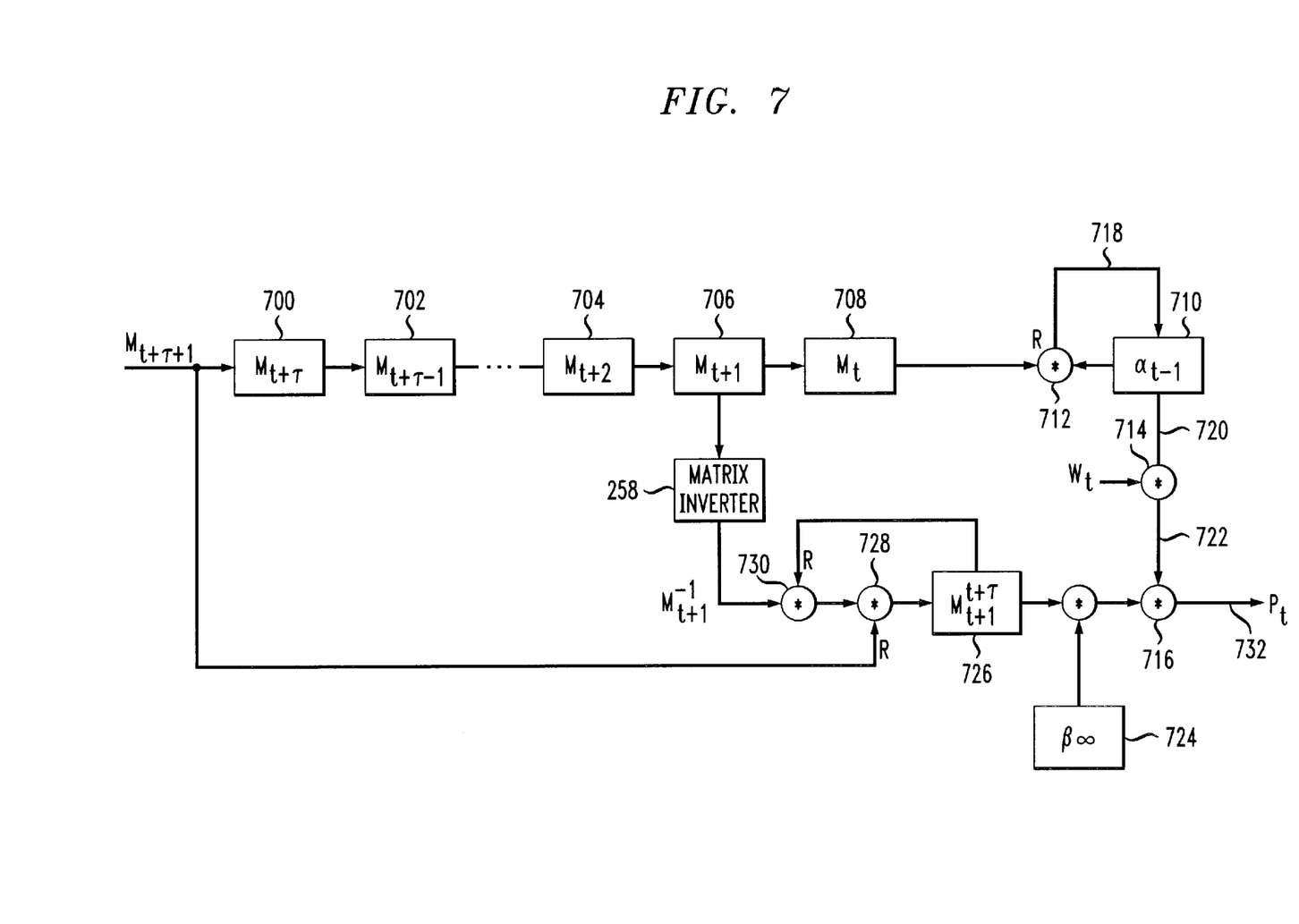
FIG. 7 illustrates a fixed-lag decoding apparatus according to another embodiment of the invention in which matrix inversion is used.

An embodiment of the invention is illustrated in FIG. 7, in which advantage is taken of the property of matrix inversion to realize storage gains in the backward portion of the algorithm. Specifically, when dealing with products of matrices necessary to compute backward portion, it is possible to avoid the chain multiplication over the complete time period t to t+$\tau$, when the intermediate matrix can be inverted. In this embodiment, the matrices for the forward portion of the algorithm are stored similarly to the apparatus of FIG. 2, with $M_t$ being stored in storage element 708, $M_{t+1}$ being stored in storage element 706, and so forth with the last $M_{t+\tau}$ being stored in storage element 700. $M_t$ is multiplied by $\alpha_{t-1}$ stored in storage element 710 by multiplier 712 and the result is stored in storage element 710 thus generating the forward portion $\alpha_t$. Simultaneously, $\alpha_{t-1}$ is sent over signal line 720 for multiplication by $W_t$ and that result is then multiplied by multiplier 716 by the product of $M_{t+1}{}^{t+\tau}$ stored in storage element 726 and $\beta_\infty$ stored in storage element 724 to crate $p_t$, generally as in the other described embodiment.

However, according to equation (6), to update the value of $\beta_t$ at time t+1, in the case of invertible matrices, storing the entire backward potion is not necessary. $M_{t+2}{}^{t+\tau+1}$ can be generated by inverting $M_{t+1}$ in the matrix inverter 258, and multiplying $M_{t+2}{}^{t+\tau+1}$ or by that inverted matrix in multiplier 730 to generate $M_{t+2}{}^{t+\tau}$ and then multiplying $M_{t+2}{}^{t+\tau}$ by $M_{t+\tau+1}$ in multiplier 728 to generate $M_{t+2}{}^{t+\tau+1}$. This has the effect of removing the earliest term from the matrix product, while adding the next multiplicative term at time t+$\tau$+1. Because of all the new matrix products, except for the last term, are dropped and the new value replaces the old one in storage element 726, no more of the backward sequence need to be saved in order to update $\beta_t$.

Figure 8:
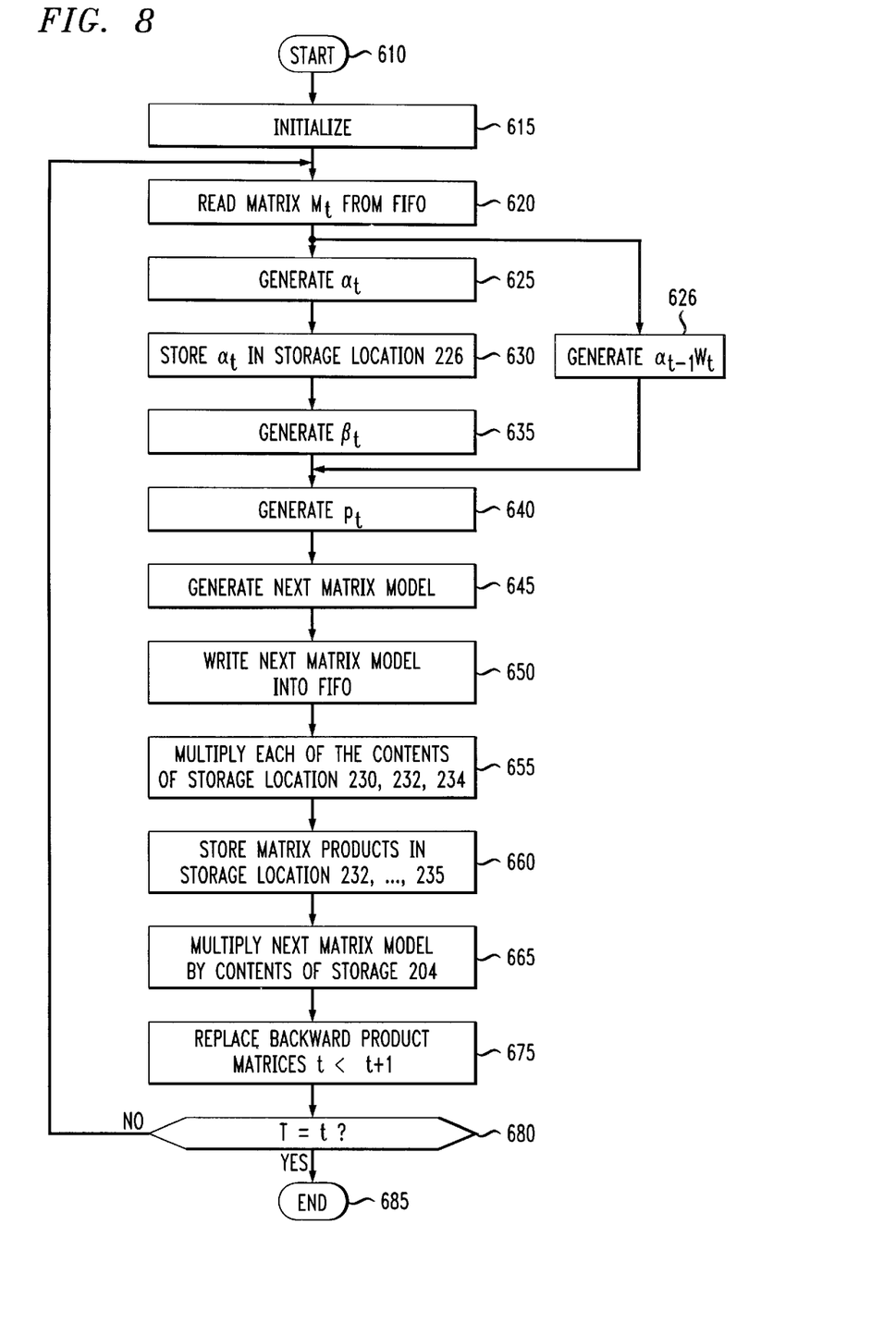
FIG. 8 illustrates a flowchart according to the invention.

The decoding operation is illustrated in another aspect in the flowchart of FIG. 8. It will be understood that the following processing steps are illustrated as executed by controller 252 in coordination with memory 254, matrix multiplier 256 and related elements. Processing begins in step 610, followed by initialization in step 615 of the matrices and parameters as described herein. In step 620, the current matrix is read from the FIFO, and in 625 that quantity is used to generate the current forward portion, $\alpha_{t-1}$. In step 626 $\alpha_{t-1}W_t$ is generated. In step 630, $\alpha_t$ is stored in storage location 226. In step 635, $\beta_t$ is generated. In step 640 $p_t$ representing the a posteriori probability of the input symbol is generated by multiplying $\alpha_{t-1}W_t$ and $\beta_t$. In step 645, the controller 252 directs the generation of the next matrix model for the following time period. In step 650, the next matrix model is written into the FIFO. In step 655, the next matrix model is multiplied by the contents of each of the storage locations 230, 232, ..., 234. In step 660, the results of those multiplications are stored in locations 232, ..., 235. The next matrix model is then overwritten in storage location 204 in step 665, and in step 675 the matrix values for succeeding storage elements 206, 208, ..., 210 are replaced with the matrix contents for the next time. In step 680, the processing tests whether time has reached the end of the time period T. If not, processing repeats for t+1, otherwise it ends in step 685.

In an alternate embodiment, the fixed-lag algorithm can be implemented in the vector form thus reducing the computation and storage requirements. Consider the following probability vectors:

$$s(X_t, Y_1^{t+\tau}) = \alpha_0 \prod_{i=1}^{t-1} M_i W_t \prod_{i=t+1}^{t+\tau} M_i = \alpha_{t-1} W_t M_{t+1}^{t+\tau} \qquad (I)$$

We can see that $s(X_t, Y_1^t)$ can be computed recursively as $$s(X_t, Y_1^t) = \alpha_{t-1} W_t \qquad (II.A)$$

$$s(X_t, Y_1^u) = s(X_t, Y_1^{u-1})M_u, \ (u=t+1, \ldots, T) \qquad (II.B)$$

Using these vectors, we can rewrite Equation (1) as $$p_t = s(X_t, Y_1^T)\beta_\infty \qquad (III)$$

A list structure can be used for evaluating the a posteriori probabilities in the following way. Suppose that, for all $X_t$ where t<u, $\alpha_{u-1}$, $s(X_t, Y_1^{u-1})$ represents a list at the moment u. We may then replace $\alpha_{u-1}$ with $\alpha_u$ and $s(X_t, Y_1^{u-1})$ with $s(X_t, Y_t^u)$ using Equation (II.B) and the equation $$\alpha_u = \alpha_{u-1}M_u \qquad (IV)$$

and add to the list $s(X_u, Y_1^u)$. At the end, we obtain $p_t$ from equation (III).

In contrast with the forward-backward algorithm, this algorithm does not have a backward portion. Thus, computing probabilities with this algorithm requires less memory than required by the forward-backward algorithm. In addition, a fixed-lag algorithm using vectors requires less storage and computation than the matrix fixed-lag algorithm presented above. In this case we do not need to keep in memory $s(X_t, Y_1^{t+\tau})$ for u≦t. Therefore, the list of the forward-only algorithm increases only at the beginning while t<τ.

Figure 9:
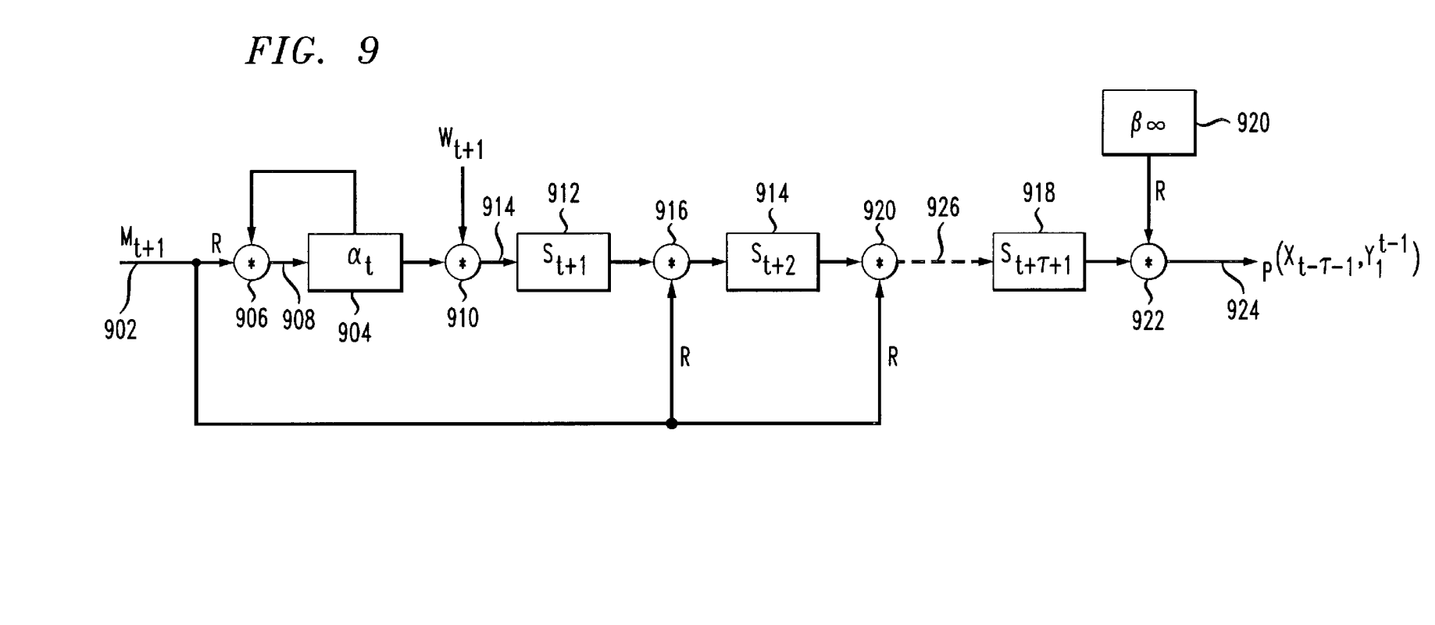
FIG. 9 illustrates a decoder in accordance with another embodiment of the present invention.

This vector fixed-lag algorithm is illustrated in FIG. 9. FIG. 9 shows a flow diagram of a process for generating the estimate $p_t$ using vectors in an alternate embodiment. Matrix $M_{t+1}$ is input along signal line 902. $\alpha_t$ is initially stored in storage element 904. Recall that $\alpha_t$ is a row vector. In this embodiment, $\alpha_t$ is right-hand multiplied by $M_{t+1}$ at multiplier 906 and right hand multiplied by matrix $W_{t+1}$ at multiplier 910. The result of the first multiplication is then stored in storage element 904. For exemplary purposes, if a row vector and a square matrix are used, the multiplication yields a row vector being stored in storage element 904. The result of the second multiplication is stored in storage element 912 as shown by arrow 914.

The storage elements 912, 914, and 918 at time t contain the probability vectors $s_{t+1}=s(X_t,Y_1^t)$, $s_{t+2}=s(X_{t-1},Y_1^t)$, ..., $s_{t+\tau+1}=s(X_{t-\tau},Y_1^t)$, respectively. The content of storage element 912 and the content of storage element 914 are right-hand multiplied by matrix $M_{t+1}$ at multipliers 916 and 920 and shifted to the next storage element as indicated by arrows. Additional storage elements may be added with the same multiplication pattern as indicated by the dashed lines 926. The product of the last multiplication is stored in storage element 918. This product is right hand multiplied with $\beta_\infty$. As discussed above, if $\beta_\infty$ is a unity column vector, the mathematical operation is summing the elements in the row vector $s_{t+\tau+1}$. The product is the probability $p_{t+\tau-1}=p(X_{t-\tau-1},Y_1^{t-1})$.

Given that row vector $\alpha_t$ is right-hand multiplied by matrix $M_{t+1}$ yielding a row vector, at the beginning of the algorithm, the storage requirements of storage elements 904, 912, 914, 918 are less than the storage requirements of the storage elements shown in FIG. 2 (storing matrices). In addition, the total number of storage elements shown in FIG. 9 is less than the total number of the storage elements shown in FIG. 2. Thus, the algorithm shown in FIG. 9 has a faster computation time than the algorithm shown in FIG. 2 as well as a smaller memory requirement.

Figure 10:
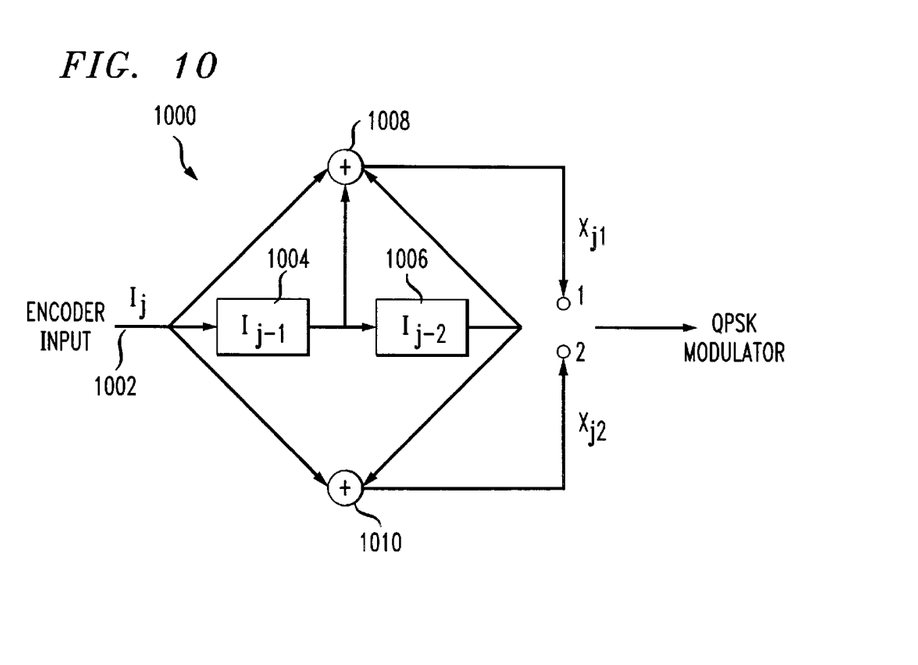
FIG. 10 illustrates an encoder in which the present invention may be used.
Figure 11:
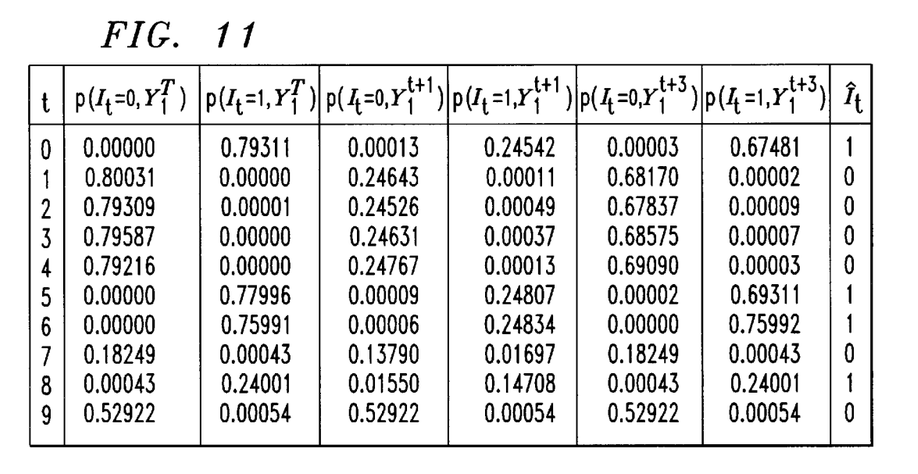
FIG. 11 illustrates a table of data exemplifying the embodiments of FIGS. 9 and 10.

FIGS. 10 and 11 are used to exemplify the process described in FIG. 9. FIG. 10 illustrates a convolutional encoder 1000 having shift registers 1004 and 1006 and summers 1008 and 1010. Input symbols $I_j$ are input into encoder 1000 along signal line 1002. As shown in FIG. 10, $$x_{j1}=I_j+I_{j-1}I_{j-2}$$

as shown by signal line 1002, shift registers 1004 and 1006 and summer 1008, and $$x_{j2}=I_j+I_{j-2}$$

as shown by signal line 1002, shift register 1006 and summer 1010. The state of encoder 1000 is shown by the contents of shift registers 1004 and 1006 and is represented by the following expression, $S_j=[x_{j-1}, x_{j-2}]$. Encoder 1000 output symbols $X_{j1}$ and $X_{j2}$ are mapped to a modulator, such as a quadrature phase shift keying (QPSK) modulator shown in FIG. 10. The encoder is a rate one-half encoder, outputting two bits for each input bit. The modulated symbols are transmitted over a communications channel with memory that is modeled by an HMM.

Assume that the communications channel has bursts of errors as presented in the following parameters: $a_0$=[0.91892 0.08108]

$$P(0) = \begin{bmatrix} 0.997 & 0.00252 \\ 0.034 & 0.81144 \end{bmatrix} \ P(1) = \begin{bmatrix} 0.0 & 0.00048 \\ 0.0 & 0.15456 \end{bmatrix}$$

The $\alpha_0$ row vector represents the initial conditions of the communications channel. The P(0) square matrix and the P(1) square matrix are the matrix probabilities of correct reception and erroneous reception, respectively. Assume further that the following bit sequence is received:
   $Y_1^T$=11 01 11 00 00 11 01 01 00 10 11 00, where T=12.
   (Given the rate one-half encoder, $Y_1$=11; $Y_2$=01; $Y_3$=11 ... $Y_{12}$=00).

FIG. 11 illustrates the normalized a posteriori probabilities of the transmitted bits given the above received bits using the forward-backward algorithm (columns two and three); the vector fixed-lag algorithm with τ=1 (columns four and five); and the vector fixed-lag algorithm with τ=3 (columns six and seven). Column one represents time t and column eight represents the predicted input bit.

So, at time t=0, using the forward-backward algorithm, we can see that the probability that the input $X_0$ was a 0 is 0.00000 and the probability that $X_0$ is a 1 is 0.79311. Thus, it is more likely that the input bit $X_0$ was a 1. Using the vector fixed-lag algorithm with the lag, or memory τ=1, we can see that the probability that the input $X_0$ was a 0 is 0.00013 and the probability that $X_0$ is a 1 is 0.24542. Thus, under this algorithm with τ=1, it is still more likely that the input bit $X_0$ was a 1.

Finally, using the vector fixed-lag algorithm, with the lag, or memory τ=3, we can see that the probability that the input $X_0$ was a 0 is 0.00003 and the probability that $X_0$ is a 1 is 0.67481. Thus, under this algorithm with τ=3 it is also more likely that the input bit $X_0$ was a 1. Column eight shows that the input $X_0$ is 1. The remaining entries in the table show the probabilities of input symbols at times t=1–9.

As we can see, the lag τ=3 estimates (columns 6 and 7) are closer to the complete a posteriori probability (columns 2 and 3) than lag τ=1 estimates (columns 2 and 3), but in both cases the vector fixed-lag algorithm decodes the same input sequence, even for these small lags, as the complete forward-backward algorithm.

The foregoing description of the system and method for processing information according to the invention is illustrative, and variations in configuration and implementation will occur to person skilled in the art.

What is claimed is:

1. A fixed-lag method for determining the probability of a transmitted symbol at a time t, transmitted along a communications channel with bursts of errors, given a received symbol, the method comprising:

obtaining initial state information vector about the channel;

obtaining channel information matrices describing the probabilities that the transmitted symbol would be transmitted along a communications channel with and without error;

generating τ intermediate probabilities, where τ equals a memory or lag value, each intermediate probability being the product of the initial state information vector, at a time previous to time t, and a channel information matrix;

storing the intermediate probabilities in storage elements; and multiplying a last intermediate probability with a final state vector to yield the probability of the transmitted symbol.

2. The fixed-lag method of claim 1, wherein the transmitted symbols are one of handwriting symbols in handwriting recognition, voice print features in voice recognition, and bioelectrical signals grouped into symbol units.

3. The fixed-lag method of claim 2, wherein the channel information matrices model processes including communication over channels, handwriting recognition, voice recognition and bioelectrical signal recognition, the matrices being generated based on modeling techniques including Hidden Markov Models.

4. A fixed-lag method for estimating an input symbol given an output symbol, the method comprising:

multiplying an initial state vector, $\alpha_0$, stored in a first storage element and containing information about an initial state of a communications channel, with a first matrix, $M_{t+1}$, containing information about the communications channel, yielding a first vector product;

multiplying the first vector product with a second matrix, $W_{t+1}$, containing information about the communications channel, yielding a second vector product, $s_{t+1}$;

storing the second vector product in a second storage element;

multiplying the second vector product with the first matrix, yielding a next vector product, $s_{t+2}$, and storing the next vector product in a next storage element;

repeating the third multiplying step using the next vector product in the multiplication, for a total of τ times, until the last vector product, $s_{t+\tau+1}$, is calculated; and multiplying the last vector product with a final state vector, $\beta_\infty$, to yield a probability, $p_{t-\tau-1}=p(X_{t-\tau-1},Y_1^{t-1})$, that a selected symbol was the input symbol.

5. The fixed-lag method of claim 4, wherein the input symbol is one of handwriting symbols in handwriting recognition, voice print features in voice recognition, and bioelectrical signals grouped into symbol units.

6. The fixed-lag method of claim 4, wherein the first and second matrices model processes including communication over channels, handwriting recognition, voice recognition and bioelectrical signal recognition, the matrices being generated based on modeling techniques including Hidden Markov Models.

7. A fixed-lag processing device for determining the probability of a transmitted symbol, transmitted along a communications channel with bursts of errors, given a received symbol, the device comprising:

a plurality of storage elements, for storing vectors;

at least one matrix multiplier; and a controller coupled to the storage elements and the at least one matrix multiplier, the controller generating τ intermediate product vectors, where each intermediate product vector is yielded by multiplying a content of one of the storage elements with a matrix, wherein the matrix contains information about the communications channel, the controller generating a last product vector and multiplying the last product vector with a final state vector, and the controller outputting the probability that the transmitted symbol is a selected symbol.

8. The fixed-lag device of claim 7, wherein the transmitted symbol is one of handwriting symbols in handwriting recognition, voice print features in voice recognition, and bioelectrical signals grouped into symbol units.

9. The fixed-lag device of claim 7, wherein the matrix models processes including communication over channels, handwriting recognition, voice recognition and bioelectrical signal recognition, the matrix being generated based on modeling techniques including Hidden Markov Models.

* * * * *